(12) United States Patent
Meng et al.

(10) Patent No.: US 9,465,649 B2
(45) Date of Patent: *Oct. 11, 2016

(54) EXECUTING DISTRIBUTED GLOBALLY-ORDERED TRANSACTIONAL WORKLOADS IN REPLICATED STATE MACHINES

(71) Applicant: International Business Machines Corporation, Armonk, NY (US)

(72) Inventors: Shicong Meng, Elsmford, NY (US); Li Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/863,065

(22) Filed: Apr. 15, 2013

(65) Prior Publication Data

US 2014/0310239 A1    Oct. 16, 2014

(51) Int. Cl.
*G06F 17/30* (2006.01)
*G06F 9/46* (2006.01)

(52) U.S. Cl.
CPC ..................... *G06F 9/466* (2013.01)

(58) Field of Classification Search
CPC ..................... G06F 17/30008; G06F 11/2097; G06F 17/30575
USPC ........................................................ 707/615
See application file for complete search history.

(56) References Cited

U.S. PATENT DOCUMENTS

| 6,009,265 | A | 12/1999 | Huang et al. |
| 6,182,186 | B1 | 1/2001 | Daynes |
| 6,397,352 | B1 | 5/2002 | Chandrasekaran et al. |
| 6,412,034 | B1 | 6/2002 | Chan |
| 6,823,356 | B1 | 11/2004 | Novaes et al. |
| 6,848,109 | B1 * | 1/2005 | Kuhn ..................... G06F 9/466 718/101 |
| 7,124,415 | B1 * | 10/2006 | Luft ............................. 719/317 |
| 7,210,019 | B2 | 4/2007 | Corrado |
| 7,363,453 | B1 | 4/2008 | Arnan et al. |
| 7,418,706 | B1 | 8/2008 | Luo et al. |
| 7,653,668 | B1 * | 1/2010 | Shelat et al. .................. 707/610 |
| 8,086,566 | B2 | 12/2011 | Edlund et al. |
| 8,095,741 | B2 | 1/2012 | Heller, Jr. et al. |
| 8,140,522 | B2 | 3/2012 | Min et al. |
| 8,201,171 | B2 | 6/2012 | Duffy et al. |
| 8,214,612 | B1 * | 7/2012 | Natanzon ..................... 711/162 |

(Continued)

OTHER PUBLICATIONS

Itziar Arrieta-Salinas, et al., "Classic Replication Techniques on the Cloud", 2012 Seventh International Conference on Availability, Reliability and Security, 2012 IEEE, pp. 268-273.

(Continued)

*Primary Examiner* — Scott A Waldron
*Assistant Examiner* — Dongming Wang
(74) *Attorney, Agent, or Firm* — F. Chau & Associates LLC

(57) ABSTRACT

A method of transaction replication includes transmitting at least one transaction received during an epoch from a local node to remote nodes of a domain of 2N+1 nodes at the end of an epoch (N is an integer greater than or equal to 1). The remote nodes log receipt of the at least one transaction, notify the local node of the receipt of the at least one transaction, transmit the at least one transaction to all of the 2N+1 nodes, and add the at least one transaction to an execution order upon receiving at least N+1 copies of the at least one transaction.

10 Claims, 7 Drawing Sheets

(56) References Cited

U.S. PATENT DOCUMENTS

| | | | |
|---|---|---|---|
| 8,281,185 B2 | 10/2012 | Nussbaum et al. | |
| 8,301,593 B2 | 10/2012 | Hoffmann et al. | |
| 8,977,591 B1* | 3/2015 | Syed | G06F 17/30575 707/612 |
| 2002/0194015 A1 | 12/2002 | Gordon et al. | |
| 2005/0203962 A1* | 9/2005 | Zhou et al. | 707/200 |
| 2007/0011417 A1* | 1/2007 | Sicola | 711/162 |
| 2009/0049054 A1* | 2/2009 | Wong et al. | 707/10 |
| 2010/0145911 A1* | 6/2010 | Germer | G06F 17/30581 707/622 |
| 2012/0150802 A1 | 6/2012 | Popov et al. | |
| 2012/0254887 A1 | 10/2012 | Rodriquez | |
| 2012/0278288 A1 | 11/2012 | Deshmukh et al. | |
| 2012/0324472 A1 | 12/2012 | Rossbach et al. | |

OTHER PUBLICATIONS

Nalini Belaramani, et al., "PRACTI Replication", USENIX Association, NSDI '06: 3rd Symposium on Networked Systems Design & Implemetnation, pp. 59-72.

Peter Bodik, et al., "Surviving Failures in Bandwidth-Constrained Datacenters", SIGCOMM '12, Aug. 13-17, 2012, Helsinki, Finland.

William J. Bolosky, et al., "Paxos Replicated State Machines as the Basis of a High-Performance Data Store", nsdi '11, 8th USENIX Symposium on Networked Systems Design and Implementation, Mar. 30-Apr. 1, 2011, Boston, MA.

Alexander Thomson, et al., "Calvin: Fast Distributed Transactions for Partitioned Database Systems", SIGMOD '12, May 20-24, 2013, Scottsdale, Arizona.

Tuan Cao, et al., "Fast Checkpoint Recovery Algorithms for Frequently Consistent Applications", SIGMOD '11, Jun. 12-16, 2011, Athens, Greece.

Tushar Chandra, et al., "Paxos Made Live—An Engineering Perspective", ACM PODC 2007, pp. 1-16.

Wyatt Lloyd, et al., "Don't Settle for Eventual: Scalable Casual Consistency for Wide-Area Storage With COPS", SOSP '11, Oct. 23-26, 2011, Cascais, Poland, pp. 1-16.

David Lomet, et al., "Unbundling Transaction Services in the Cloud", CIDR Perspectives 2009.

Tin Tin Nyo, "Maximizing the Degree of Concurrency and Consistency in Distributed Parallel Processing Environment", 2009 IEEE, pp. 258-262.

C. Mohan, et al., "Transaction Management in the R* Distributed Database Management System", ACM Transactions on Database Systems, vol. 11, No. 4, Dec. 1986, pp. 378-396.

Edward K. Lee and Chandramohan A. Thekkath, "Petal: Distributed Virtual Disks", Published in the Proceedings of the 7th International Conference on Architectural Support for Programming Languages and Operating Systems—1996; pp. 1-9.

Jun Rao, et al, Using Paxos to Build a Scalable,. Consistent, and Highly Available Datastore, Proceedings of the VLDB Endowment, vol. 4, No. 4, pp. 243-254.

Sudipto Das, et al., "G-Store: A Scalable Data Store for Transactional Multi key Access in the Cloud", SoCC'10, Jun. 10-11, 2010, Indianapolis, Indiana.

James C. Corbett et al., "Spanner: Google's Globally-Distributed Database", Published in the Proceedings of OSDI 2012. pp. 1-14.

Haifeng Yu, et al., "Design and Evaluation of a Continuous Consistency Model for Replicated Services", http://www.cs.duke.edu/ari/issag/TACT/.

US OA dated Mar. 18, 2015 for U.S. Appl. No. 14/023,921.
US OA dated Mar. 26, 2015 for U.S. Appl. No. 13/863,022.
US OA dated Apr. 9, 2015 for U.S. Appl. No. 14/023,867.
US OA dated Oct. 16, 2015 for U.S. Appl. No. 13/863,022.
US OA Dated Apr. 26, 2016 for U.S. Appl. No. 13/863,022.

* cited by examiner

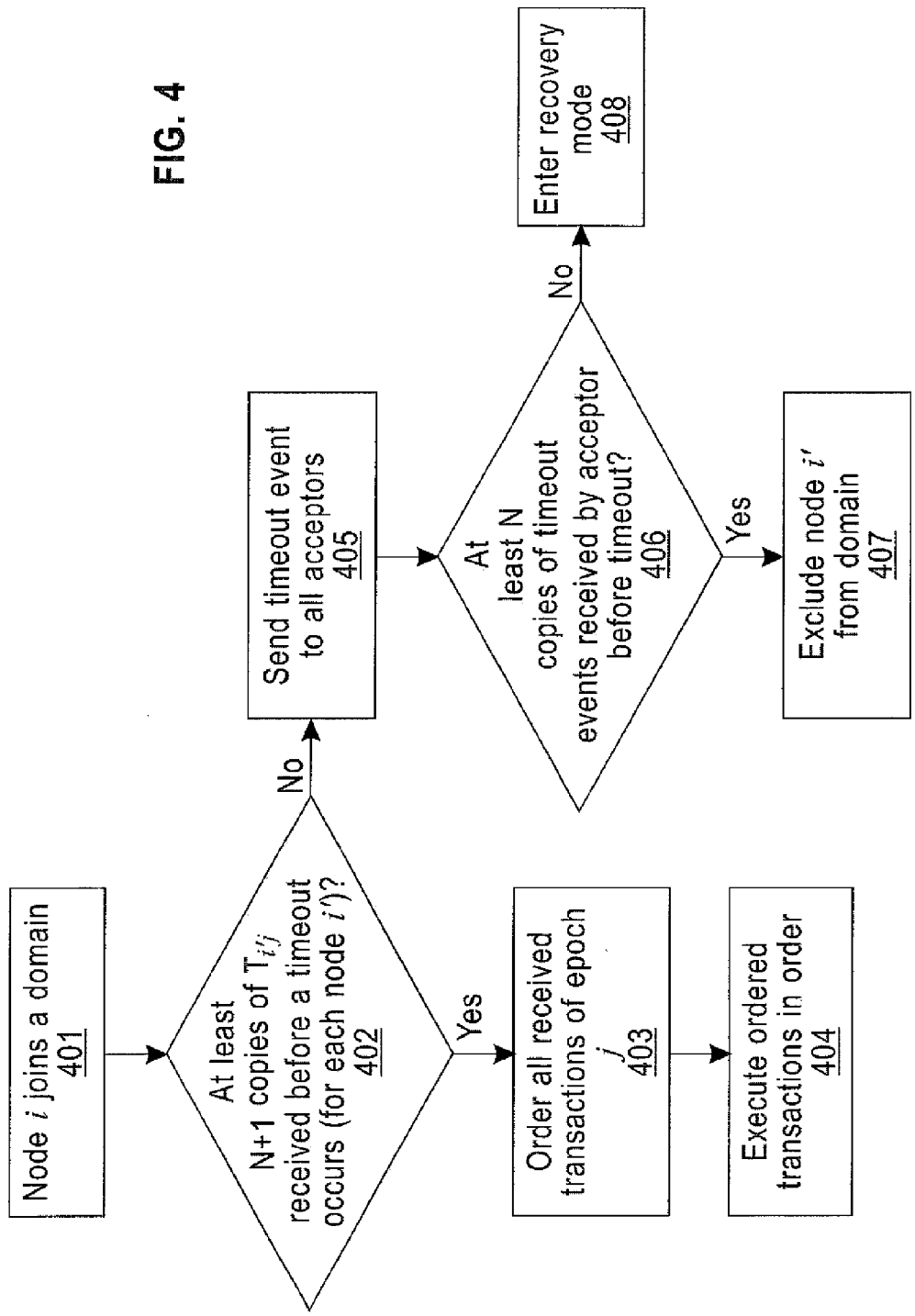

EXECUTING DISTRIBUTED GLOBALLY-ORDERED TRANSACTIONAL WORKLOADS IN REPLICATED STATE MACHINES

BACKGROUND

1. Technical Field

The present disclosure relates to transaction processing, and more particularly, to a system and method for executing distributed globally-ordered transactional workloads in replicated state machines.

2. Discussion of Related Art

The rapid development of cloud computing and networking infrastructure has improved the availability of business information systems across the globe. As a popular deployment paradigm, business applications often run in distributed datacenters. Clients connect to their local datacenters to minimize data access latency. To ensure business applications running in different datacenters share the same view of data, application developers often rely on cross-datacenter data replication services or global transaction support.

Some cloud systems adopt a primary-secondary deployment for data replication over multiple datacenters, in which one primary datastore has the most recent version of the data, and one or more secondary datastores asynchronously replicate updates from the primary datastore to local datastores. In such a system, since all write operations can only be performed on the primary datastore to ensure data consistency, data access of clients remote to the primary datastore may be delayed. Further, read operations on secondary datastores may yield stale results due to asynchronous replication, which may not be acceptable for business applications with high consistency requirements.

In addition, some cloud systems adopt a primary-primary deployment for data replication over multiple datacenters, in which any participating datastore can perform read and write operations while still maintaining a globally consistent data copy. In such a system, a transaction is either committed or aborted globally. That is, if one datastore fails to execute (e.g., as the result of deadlocks), an entire transaction is aborted.

BRIEF SUMMARY

According to an exemplary embodiment of the present invention, a method of transaction replication includes transmitting at least one transaction received during an epoch, by a local datastore node, to at least one remote datastore node of a plurality of remote datastore nodes upon an end of the epoch, wherein the epoch corresponds to a predefined time period having a fixed length, and the local datastore node and the plurality of remote datastore nodes are part of a domain of 2N+1 datastore nodes, wherein N is an integer greater than or equal to 1. The method further includes logging a receipt of the at least one transaction, by the at least one remote datastore node, upon receiving the at least one transaction at the at least one remote datastore node. The method further includes notifying the local datastore node of the receipt of the at least one transaction, by the at least one remote datastore node, upon receiving the at least one transaction at the at least one remote datastore node. The method further includes transmitting the at least one transaction to all datastore nodes in the domain other than the local datastore node and the at least one remote datastore node, by the at least one remote datastore node, upon receiving the at least one transaction at the at least one remote datastore node. The method further includes adding the at least one transaction to an execution order, at each of the datastore nodes of the domain, upon receiving at least N+1 copies of the at least one transaction at each of the datastore nodes.

In an exemplary embodiment the method further includes measuring an elapsed time, by the at least one remote datastore node, since last logging the receipt of the at least one transaction, transmitting a timeout message to all datastore nodes in the domain, by the at least one remote datastore node, upon the elapsed time exceeding a predefined timeout threshold, transmitting a timeout confirmation message to all datastore nodes in the domain, by each of the datastore nodes of the domain, upon receiving at least N+1 timeout confirmation messages regarding the local datastore node at each of the datastore nodes, and removing the local datastore node from a participating datastore node list, by each of the datastore nodes of the domain, upon receiving at least N+1 timeout confirmation messages regarding the local datastore node at each of the datastore nodes.

In an exemplary embodiment, the method further includes discarding unfinished processes that have occurred prior to removal from the participating datastore node list, by the local datastore node, upon being removed from the participating datastore node list, transmitting a recovery notification message, to each of the datastore nodes in the domain, by the local datastore node, and adding the local datastore node to the participating datastore node list, by each of the datastore nodes of the domain, upon each of the datastore nodes receiving at least N+1 copies of the recovery notification message.

In an exemplary embodiment, the local datastore node is added to the participating datastore node list by each of the datastore nodes of the domain during different epochs.

In an exemplary embodiment, the method further includes generating a local signature corresponding to the local datastore node, by the local datastore node, transmitting the local signature, by the local datastore node, to all datastore nodes in the domain, generating a remote signature corresponding to the at least one remote datastore node, by the at least one remote datastore node, transmitting the remote signature, by the at least one remote datastore node, to all datastore nodes in the domain, transmitting a signature mismatch notification linked to the remote signature, by the at least one remote datastore node, to the local datastore node upon determining that the remote signature does not match the local signature, and disconnecting the local datastore node from the domain of datastore nodes upon the local datastore node receiving at least N+1 signature mismatch notifications linked to the remote signature.

In an exemplary embodiment, the method further includes restoring the disconnected local datastore node using the remote signature.

According to an exemplary embodiment of the present invention, a method of establishing a global consistent execution order of transactions includes receiving at least one local transaction during an epoch at a local datastore node. The method further includes receiving at least one remote transaction during the epoch, at a remote datastore node, wherein the epoch corresponds to a predefined time period having a fixed length, and the local and remote datastore nodes are part of a domain of 2N+1 datastore nodes, wherein N is an integer greater than or equal to 1. The method further includes assigning a timestamp to each of the at least one local and remote transactions upon respectively receiving the at least one local and remote transactions, wherein the timestamps correspond to a respective arrival time of the at least one local and remote transactions. The method further includes assigning an epochId to each of the at least one local and remote transactions upon respectively receiving the at least one local and remote transactions, wherein the epochId corresponds to the epoch in which the at least one local and remote transactions were respectively received. The method further includes combining the at least one local transaction and the at least one remote transaction into a transaction set. The method further includes assigning a global order to all transactions within the transaction set.

In an exemplary embodiment, assigning the global order is based on respective timestamps and epochIds of all transactions within the transaction set.

In an exemplary embodiment, assigning the global order is further based on respective node IDs of all transactions within the transaction set, and the respective node IDs correspond to a node at which the transactions were received.

In an exemplary embodiment, at least one local transaction is a read-only transaction, and the read-only transaction is not combined into the transaction set.

BRIEF DESCRIPTION OF THE SEVERAL VIEWS OF THE DRAWINGS

Exemplary embodiments of the present disclosure will be described below in more detail, with reference to the accompanying drawings, in which:

FIG. 4 is a flowchart showing operations of a node functioning as a learner, according to an exemplary embodiment of the present invention.

DETAILED DESCRIPTION

Figure 1:
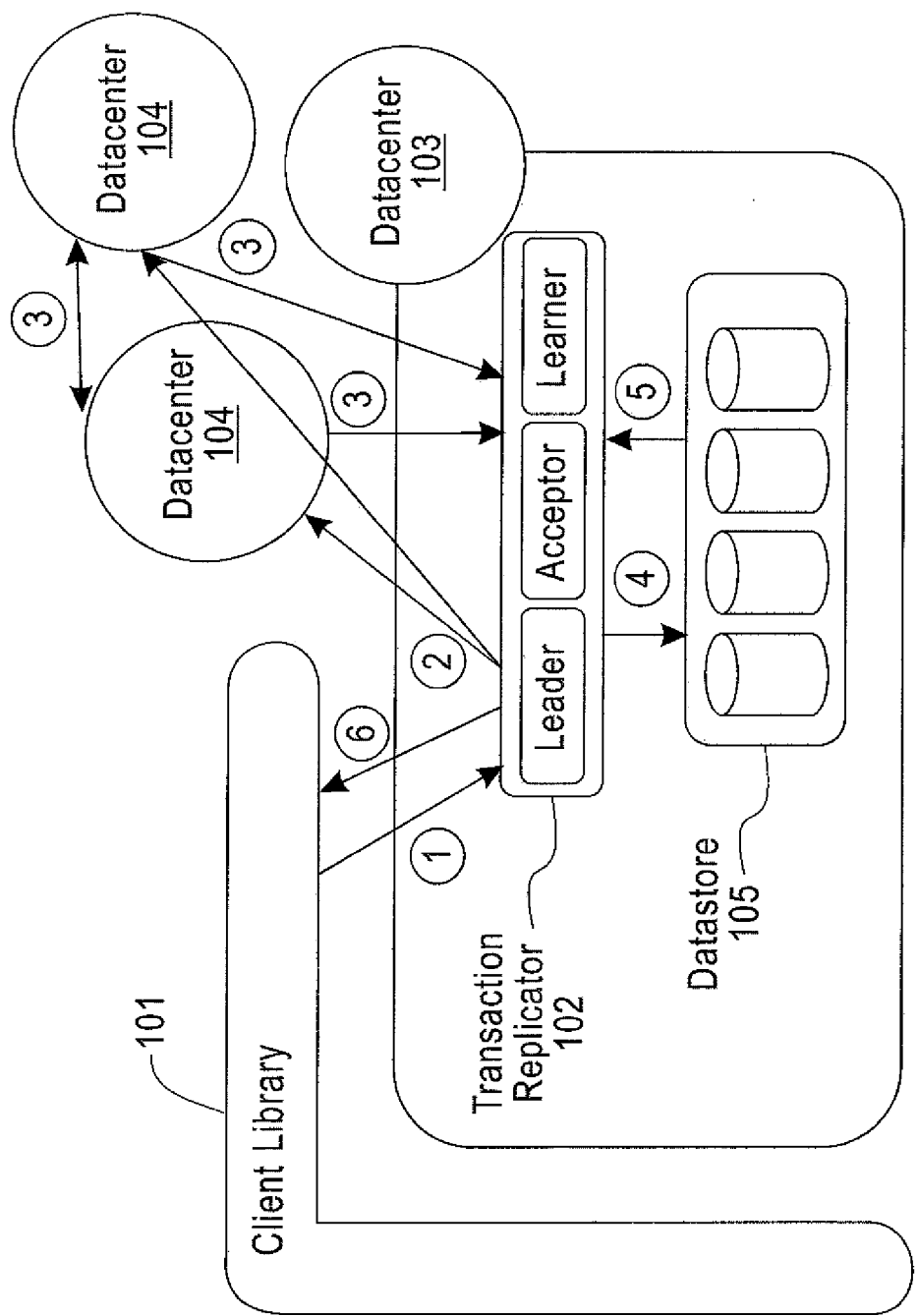
FIG. 1 shows a distributed globally-ordered transactional workload system, according to an exemplary embodiment of the present invention.

Exemplary embodiments of the present invention now will be described more fully hereinafter with reference to the accompanying drawings. This disclosure, may however, be embodied in many different forms and should not be construed as limited to embodiments set forth herein.

Exemplary embodiments of the present invention are directed to a transaction service framework that implements a transaction replication process, establishes a global consistent execution order of workloads on all nodes without utilizing clock synchronization, and detects inconsistencies among distributed nodes. The transaction service framework according to exemplary embodiments may ensure consistency of replicated data across distributed nodes in a distributed system. Examples of distributed systems that the transaction service framework may be used with include, but are not limited to, distributed databases, distributed application servers, distributed storage, distributed publish and subscribe systems, etc.

For ease of description, exemplary embodiments are described herein with reference to distributed databases that are replicated across geographically distributed datacenters and that process transaction workloads, however, exemplary embodiments are not limited thereto. For example, business applications may be deployed in a cloud computing environment and may be executed across distributed datacenters. In this setting, clients may connect to their local datacenters, as opposed to remote datacenters, to reduce or minimize data access latency. Exemplary embodiments of the present invention are directed to a transaction replication process that results in business applications running in different datacenters sharing the same consistent view of data.

Business applications, as well as various other types of applications, as discussed above, rely on a set of replicated datastores running in different datacenters. Herein, a group of replicated datastores that collectively execute transactions may be referred to as a domain. A single datacenter may host different datastores for different applications, and thus, may be included in multiple domains. A transaction service may be utilized to orchestrate the execution of a transaction across all datastores within the same domain, and may provide an abstraction of a single global domain datastore image to clients. Clients are connected to the transaction service running within their respective local datacenters, which may reduce read/write latency.

Datacenters may be interconnected with each other through dedicated communication links, which are utilized for distributed transactions occurring amongst the datacenters. The round-trip latency of the dedicated communication links may typically be between about 50 ms and about 200 ms, and may increase when a link is congested. For example, the round-trip latency of a communication link may increase to about 10 seconds when the amount of data to be transmitted is large, or when the link is undergoing device failures or malfunction. Device failures and/or malfunctions may be the result of common errors such as, for example, software crashes, detected or undetected hardware failures, network failures, viruses, site disasters, etc.

The transaction service framework, according to exemplary embodiments of the present invention, is independent of the underlying datastore implementation. For example, the transaction service framework may be utilized with any datastore implementation in which the datastores provide a table abstract where each row is uniquely identified by a rowId. As a result, the transaction service framework according to exemplary embodiments may be used with commonly used datastores, including, for example, both traditional relation databases and NoSQL databases.

The transaction service framework, according to exemplary embodiments, may be used with online transaction processing (OLTP), which is utilized in many business applications. Further, the transaction service framework supports full-featured ACID (Atomicity, Consistency, Isolation, Durability) transactions over distributed datastores. Although typical ACID transactions require the isolation level to be serializable, wherein the results of execution are equivalent to that of a sequential execution of any order of inputs, exemplary embodiments of the present invention provide for sequential isolation, wherein the results of execution are equivalent to that of the sequential execution of a specific order of inputs.

The transaction service framework, according to exemplary embodiments, does not rely on clock synchronization, and does not require distributed synchronization protocols such as, for example, network time protocol (NTP) or special timing devices such as atomic clocks. Rather, the transaction service framework utilizes millisecond-level measurement of elapsed time which is used for dividing transactions received from clients into different epochs. As used herein, an epoch refers to a time period with a fixed length. Varying the fixed length of the epoch results in a tradeoff between replication delay and communication overhead. For example, as the length of the epoch is increased, the replication delay increases and the communication overhead is reduced. The length of the epoch is configurable by the user, allowing the user to select a proper value based on the replication delay and communication cost requirements of the current system. In an exemplary embodiment, synchronized wall clock time (e.g., a millisecond-level measurement that is achievable with NTP) may be used to reduce replication latency, however, exemplary embodiments may not utilize synchronized wall clock time.

According to exemplary embodiments, data may be replicated across a distributed system, and the replicated data may be consistently maintained across the distributed nodes of the distributed system. Exemplary embodiments may minimize or reduce the number of round-trips needed for communication during the replication process, and may avoid the occurrence of distributed locks and deadlocks. Further, exemplary embodiments of the replication process replicates transactions received from all participating nodes into a globally consistent batch of transactions on each node (e.g., all-to-all replication) without a centralized sequencer, and results in only a single round trip of communication that may survive N simultaneous node failures in a domain including 2N+1 nodes. As used herein, N is an integer greater than or equal to 1.

FIG. 1 shows a distributed globally-ordered transactional workload system, according to an exemplary embodiment of the present invention. Exemplary embodiments of a transaction service framework that implements a transaction replication process, establishes a global consistent execution order of workloads on all nodes without utilizing clock synchronization, and detects inconsistencies among distributed nodes may be utilized with the transactional workload system shown in FIG. 1. The transaction service framework is described in further detail with reference to FIGS. 2 to 7.

Referring to FIG. 1, clients may utilize a client library 101 to interact with the transaction service running in their respective local datacenters. A client library 101 also handles the switching between datacenters during failures. Herein, a cluster running on a datacenter may be referred to as a node, and the terms datacenter and node may be used interchangeably. Further, a workload may consist of one or more transactions. In FIG. 1, circled numbers one through six relate to an order of operations of the transactional workload system, as described herein.

Within a transaction service, a transaction replicator 102 receives transactions submitted by local client libraries, which are referred to herein as local transactions. The transaction replicator 102 replicates local transactions to remote datacenters using a replication process according to exemplary embodiments of the present invention, as described in further detail below. In FIG. 1, datacenter 103 is referred to as a local datacenter, and datacenters 104 are referred to as remote datacenters. The transaction replicator 102 may ensure that all local transactions are consistently replicated to all datastores 105 in the same domain, and may be used to establish a unique global order of all transactions of the same domain on all datacenters, as described in further detail below. Although FIG. 1 shows a single transaction replicator 102 corresponding to the local datacenter 103, each remote datacenter 104 may include a transaction replicator.

As described above, the transaction service framework according to exemplary embodiments does not depend on a particular datastore implementation. That is, the datastore implementation used with the transaction service framework may function as a persistent layer by performing read and write operations upon request. Transactions performed on the datastores are executed in the order specified by the transaction replicator 102. Execution in the specific order may be accomplished in a variety of manners. For example, datastores may sequentially execute transactions, e.g., using a single thread to execute transactions one by one. Further, datastores may use a locking mechanism that allows transactions with different read/write sets to be executed in parallel. In addition, datastores can perform checkpointing independently. According to exemplary embodiments, checkpointing may be performed to capture a snapshot of a datastore state for backup and recovery purposes.

According to exemplary embodiments, the transaction replicator 102 and datastores decouple transaction execution and the replication of results, which may allow for the replication process to be carried out without the use of certain distributed synchronization equipment. In addition, separating the transaction manager and the datastore results in deployment flexibility relating to transaction components and data components.

Since each datacenter independently executes the same transaction input, a transaction may finish at different times at different datacenters. The client library notifies the user of the result of a transaction once it finishes at the local datacenter without waiting for the completion at other datacenters. As a result, the level of synchronization for distributed transactions may be relaxed according to exemplary embodiments of the present invention. If a client switches datacenters, the client library may determine the appropriate time to submit new transactions based on the global order of transactions. As a result, a consistent view of data may be provided to the client.

A transaction service framework that implements a transaction replication process, according to exemplary embodiments of the present invention, is described herein.

Exemplary embodiments of the replication process may be described herein with reference to two datacenters for the sake of clarity. It is to be understood that exemplary embodiments are not limited to environments having two datacenters, and may be utilized in environments including more than two datacenters. Further, as described above with reference to FIG. 1, when referring to multi-datacenter deployment environments herein, one of the datacenters is referred to as the local datacenter 103 and all other datacenters are referred to as remote datacenters 104.

The transaction replicator 102 corresponding to the local datacenter 103 receives transactions submitted by local clients (e.g., via the client library 101). These transactions are referred to herein as local transactions. Transactions received by remote datacenters 104 are referred to herein as remote transactions. According to exemplary embodiments, time is divided into time periods having a fixed length, which are referred to herein as epochs. Each epoch is assigned an epochId. The epochIds correspond to a sequentially increasing sequence of numbers used to define the epochs (e.g., epoch1, epoch2, etc.). All transaction replicators (e.g., all nodes/datacenters) utilize the same series of epochIds. As a result, transactions from different datacenters may be matched. Further, when a local transaction arrives, it is assigned a timestamp corresponding to its arrival time. In addition, each local transaction is marked with the epochId of the epoch during which the transaction is received. The length of each epoch may be, for example, about 20 ms, however the length of the epochs is not limited thereto.

The replication process results in the replication of transactions within an epoch being consistent across a plurality of datacenters in a domain. Each datacenter may function in a plurality of roles. For example, each datacenter may function in a leader role, an acceptor role, and a learner role. That is, each datacenter may function as a permanent leader with a unique ID, and may also function as both an acceptor and a learner during the replication process initiated by other datacenters. In exemplary embodiments, every node functions as a leader of its own replication (e.g., for local transactions). As a result, it is not necessary to forward all workloads to a single leader node. Herein, any reference to a leader, an acceptor, and a learner refers to nodes respectively functioning in these roles. The leader, acceptor, and learner roles are described in further detail with reference to FIGS. 2 to 4.

When no failures occur in the replication process, the leader replicates local transactions to the acceptors, the acceptors log received transactions and send copies to the learners, and the learners receive copies of the transactions from the acceptors and execute the transactions. For example, at the end of an epoch j, a datacenter i initiates the replication process by sending its local transactions received within the epoch j (e.g., $T_{ij}$) to all other datacenters. For a datacenter i', which receives $T_{ij}$, it first logs the receipt of $T_{ij}$ as an acceptor, and then notifies datacenter i that it has received $T_{ij}$. At the same time, or substantially the same time, datacenter i' also sends $T_{ij}$ to all other datacenters except i. Once a datacenter has received at least N+1 copies of $T_{ij}$ (2N+1 is the total number of participating datacenters, and N is greater than or equal to 1), the datacenter adds $T_{ij}$ to the execution queue. Once $T_{ij}$ has been executed, datacenter i notifies clients of the result of the execution (e.g., a commit operation or an abort operation is performed).

The replication process may be described as including three phases: a transaction collection phase, a replication initiation phase, and an acceptor confirmation phase. The phases may be divided based on state changes of a distributed state machine formed by the acceptors. Failures occurring during each of the three phases of the transaction replication process are described below.

Datacenter failures may include the failure of an entire datacenter as well as disconnection of a datacenter from the rest of the datacenters of the domain. Failures occurring in different phases of the transaction replication process may be isolated from each other. Although one datacenter may be in different phases of the parallel replication process, since parallel replication processes are independent of each other, failures occurring in different phases may be handled separately.

Failures may include, for example, logical errors, fail-stop environment errors, and non-fail-stop environment errors. Logical errors may refer to errors relating to application logic, such as, for example, withdrawing cash from an account with zero balance. Fail-stop environment errors may refer to errors that cause a transaction service instance running at a datacenter to fail (e.g., a software crash, a hardware failure, disasters, etc). Non-fail-stop environment errors may refer to other errors, including both detectable and non-detectable errors, such as, for example, software bugs, viruses, memory errors, etc.

When no errors occur, a transaction is successfully committed at all datacenters in a domain. When an abort is caused by a logical error, the transaction is aborted at all datacenters to ensure consistent execution results. If a transaction aborts at one datacenter due to a fail-stop environment error, but successfully commits at other datacenters, the failed datacenter may later be recovered to a state identical to the other datacenters. If a transaction aborts at one datacenters but commits at other datacenters due to a non-fail-stop environment error, a signature based approach may be utilized to detect inconsistencies, as described in further detail below.

Referring to a situation where a failure(s) occurs during the collection phase in the replication process, if a datacenter fails, it can no longer initiate the replication of its local transactions as a leader. Datacenters measure the elapsed time $t_i^\theta$ since the most recent receipt of transaction replications from a datacenter i. If a timeout occurs, e.g., $t_i^\theta > t_{timeout}$, a datacenter sends a timeout message to all other datacenters to indicate that datacenter i has caused a timeout. A timeout occurs when the elapsed time exceeds a predefined timeout threshold. When a datacenter has received at least N+1 copies of a timeout message regarding datacenter i, a datacenter may send a timeout confirmation message to all other datacenters. Similarly, when a datacenter receives at least N+1 copies of the timeout confirmation message regarding datacenter i, datacenter i may be removed from the participating datacenter list. Thus, according to exemplary embodiments, the transaction service framework may suffer at most N simultaneous datacenter failures.

Referring to a situation where a failure(s) occurs during the initiation phase in the replication process, if a leader fails before at least N+1 acceptors receive the replicated transactions, no learners would be able to receive N+1 replications from acceptors. Therefore, all learners have the same consistent result for the replication. If the leader fails after at least N+1 acceptors have received the replicated transactions, the leader can learn the replicated transactions after the leader has recovered.

Acceptors may also fail during the initiation phase. When an acceptor fails during the initiation phase, the learner of the same datacenter also fails. When N+1 acceptors exist in the domain that has received the replicated transactions, other than a timeout occurring in the next epoch, no functional datacenters are impacted by the failures of the acceptor(s).

The replication process may continue while the leader has received at least N+1 confirmations from the acceptors. However, if more than N+1 acceptors have failed, the leader may determine that less than N+1 acceptors have received the transaction replications upon receiving a timeout on reply messages from the acceptors. As a result, the replication process may not continue.

When an acceptor recovers, all previous unfinished processes are discarded, and the replication process may be joined for the next epoch. An acceptor may recover if there are at least N+1 running acceptors. To recover, the failed acceptor may notify all running acceptors that it is ready to rejoin the group. The running acceptors may then notify all leaders that the failed acceptor has recovered by piggybacking the notification in the reply messages to the leader. Once a leader receives at least N+1 copies of the recovery notification message, the leader may include the recovered acceptor in future replication processes. Different leaders may start to include the recovered acceptor in different epochs, since having at least N+1 running acceptors is sufficient for the transaction replication process.

If the leader itself has been disconnected from the rest of the network after it sends out the replicated transactions, and the leader has not recovered from the failure during the lifetime of the replication process, transactions may be replicated consistently to all learners, and acceptors may later detect timeouts of the failed leader. When the leader later recovers, since it did not receive any confirmation from acceptors or learners, the leader may attempt to reinitiate the replication process by sending local transactions to all acceptors again. If the acceptors have logged the previous message, the acceptors notify the leader that the current replication process has completed, and the leader will add the local transactions to its execution queue.

If the leader recovers within the acceptor confirmation phase, and if the leader received the confirmation message from the acceptors, the replication process may continue at this point. Otherwise, the leader may learn the status of the replication process after the leader has recovered.

A learner may fail to receive at least N+1 transaction replications for a number of reasons. For example, more than N+1 acceptors may have failed, the learner itself may have been disconnected from the network, or the leader may not have sent local transactions to at least N+1 acceptors. If more than N+1 acceptors have failed or if the learner has been disconnected from the network, the learner attempts to communicate with all acceptors to determine the latest state. Until the learner has received the latest state from at least N+1 acceptors, the learner halts executing transactions. If the leader has not sent local transactions to at least N+1 acceptors, the learner receives timeout messages from the acceptors.

Figures 2, 3:
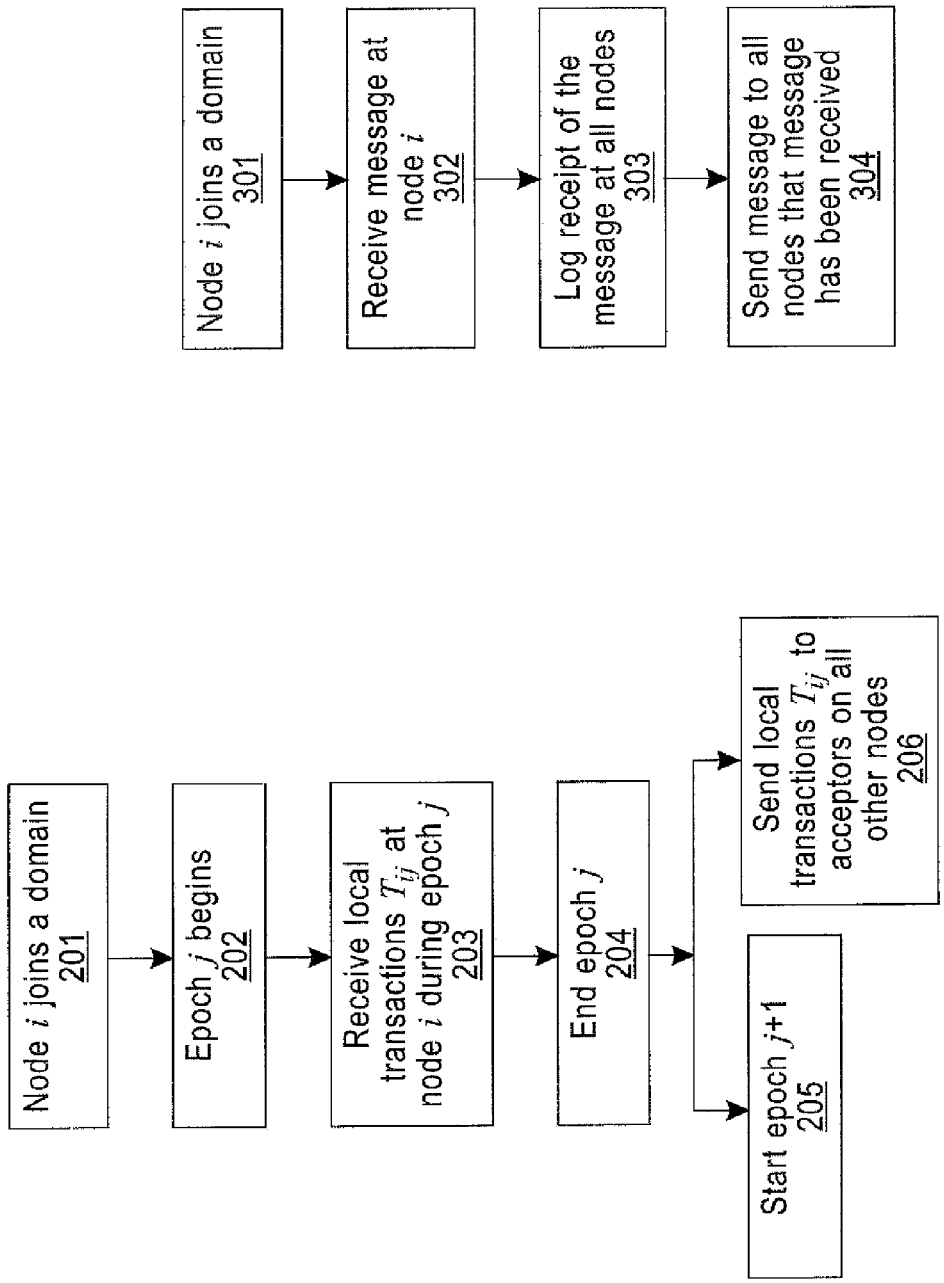
FIG. 2 is a flowchart showing operations of a node functioning as a leader, according to an exemplary embodiment of the present invention.
FIG. 3 is a flowchart showing operations of a node functioning as an acceptor, according to an exemplary embodiment of the present invention.

FIG. 2 is a flowchart showing operations of a node functioning as a leader, according to an exemplary embodiment of the present invention.

At block 201, node i joins a domain. At block 202, epoch j begins. During epoch j, local transactions, $T_{ij}$, are received at node i at block 203. Epoch j ends at block 204. Once epoch j has ended, a subsequent epoch j+1 is started at block 205, and all local transactions received during epoch j are sent to all acceptors on all other nodes in the domain at block 206.

FIG. 3 is a flowchart showing operations of a node functioning as an acceptor, according to an exemplary embodiment of the present invention.

At block 301, node i joins a domain. At block 302, a message indicating the occurrence of either a transaction or a control event is received at node i. The message may be received at all nodes in the domain. At block 303, receipt of the message at all nodes is logged. At block 304, a message is sent to all nodes that the message has been received. In an exemplary embodiment, a leader may send the message to all acceptors, including the acceptor located at the same node as the leader itself. As a result, an acceptor may not need to distinguish whether a message is sent from a local leader or a remote leader.

FIG. 4 is a flowchart showing operations of a node functioning as a learner, according to an exemplary embodiment of the present invention.

At block 401, node i joins a domain. At block 402, for each node i', where i' refers to all nodes, it is determined whether at least N+1 copies of $T_{i'j}$ been received before a timeout occurs. If at least N+1 copies of $T_{i'j}$ have been received before a timeout occurs, all received transactions of epoch j are ordered at block 403, and the ordered transactions are executed in order at block 404. If at least N+1 copies of $T_{i'j}$ have not been received before a timeout occurs, a timeout event (e.g., a timeout notification) is sent to all acceptors at block 405. At block 406, it is determined whether at least N copies of timeout events have been received by an acceptor before a timeout. If at least N timeouts have been received, node i' is excluded from the domain at block 407. Otherwise, recovery mode is entered at block 408.

Figure 5:
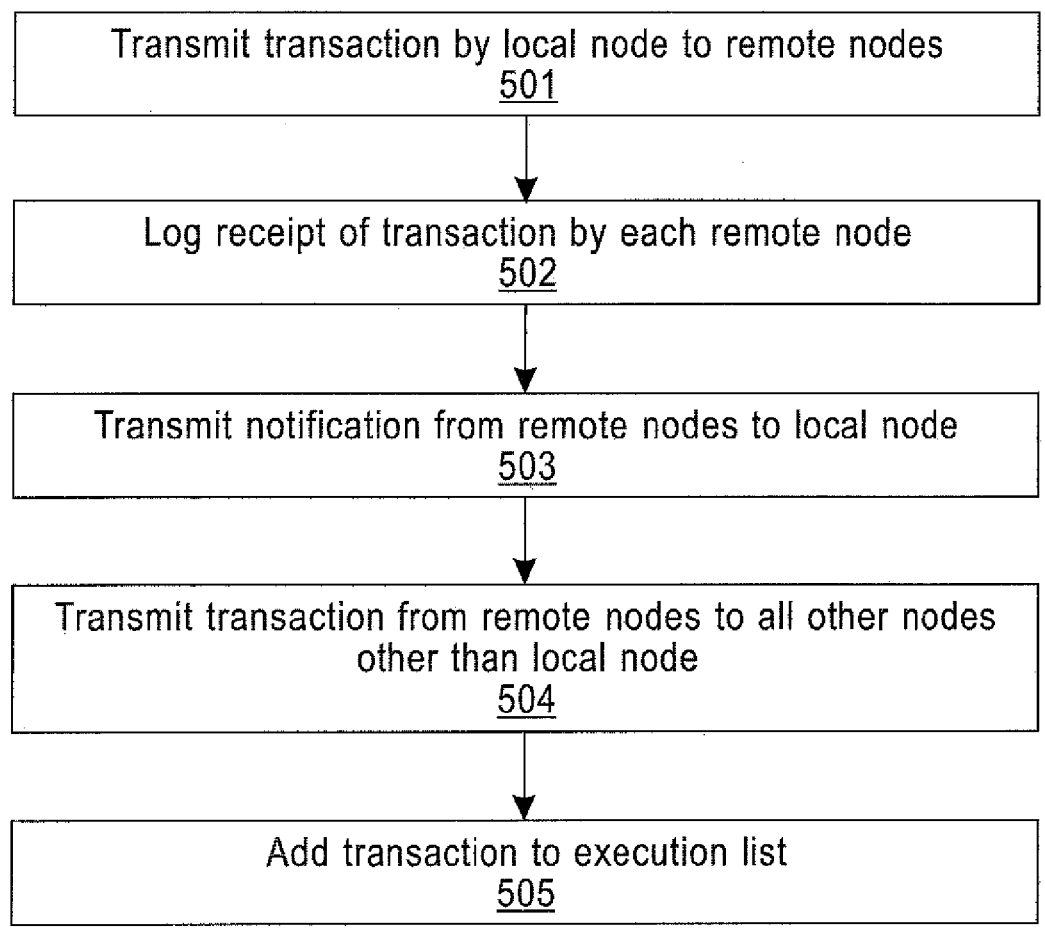
FIG. 5 is a flowchart showing a transaction replication process, according to an exemplary embodiment of the present invention.

FIG. 5 is a flowchart showing a transaction replication process, according to an exemplary embodiment of the present invention.

At block 501, at the end of an epoch, at least one transaction is transmitted by a local node to all remote nodes in the domain. The epoch corresponds to a predefined time period having a fixed length, and the local and remote nodes are part of a domain of 2N+1 nodes, where N is greater than or equal to 1. At block 502, receipt of the at least one transaction is logged by each remote node that has received the at least one transaction. The receipt is logged upon the node(s) receiving the transaction. At block 503, a notification is transmitted from the remote node(s) that have received the at least one transaction to the local node. The notification indicates that the remote node(s) has received the at least one transaction, and is transmitted upon the remote node(s) receiving the transaction. At block 504, the at least one transaction is transmitted from all remote node(s) that have received the transaction to all nodes other than the local node. At block 505, upon receiving at least N+1 copies of the at least one transaction, the at least one transaction is added to the execution list of each node that has received the transaction.

A transaction service framework that establishes a global consistent execution order of workloads on all nodes without utilizing clock synchronization, according to exemplary embodiments of the present invention, is described herein.

At the end of an epoch j, the transaction replicator at a local datacenter i sends its local transactions received within j (e.g., $T_{ij}$) to the transaction replicators in all remote datacenters via the transaction replication process. Similarly, transaction replicators in the remote datacenters send their respective local transactions collected within an epoch to the transaction replicators in all other datacenters.

Transactions of the same epoch may not be synchronously replicated. Furthermore, read-only transactions may not be replicated to remote datacenters. After confirming that both local transactions and all remote transactions of epoch j have been successfully replicated, the local replicator combines both local transactions and all remote transactions into a transaction set, and a global order is assigned to transactions in the transaction set. The transaction set $S_j$ of an epoch j includes all transactions received within epoch j at all datacenters.

The order of transactions in $S_j$ is unique on all datacenters. Establishing the order of any two transactions may be based on several factors, including, for example, the epoch of the transactions, the local datacenter IDs, the local timestamp, and other application-level information.

As used herein, $\sigma$ represents the length of an epoch, $\epsilon$ represents the error bound on the actual epoch length, and $\tau$ represents the error bound of clock skews between datacenters. When the difference of local timestamps of two transactions t1 and t2 is greater than the sum of $\sigma$, $\epsilon$ and $\tau$, e.g., $|t1-t2|>\sigma+\epsilon+\tau$, the two transactions are in two different epochs, regardless of where they are submitted within the distributed system. The sum of σ, ε and τ is referred to herein as the ordering interval, and may be represented by δ. Thus, when ordering-sensitive transactions are submitted to the system with timestamps that differ at the granularity of δ, the execution order of the transactions is determined by the order of their local timestamps. This relation may be used to achieve external consistency where the execution order of transactions is determined by their real-time occurrence.

Among the three time components of δ, σ, ε and τ, σ may be the dominant component. While σ is configurable, there may be a fundamental tradeoff between efficiency and ordering granularity. When reducing σ, δ becomes smaller and transactions are more likely to be assigned to different epochs. However, the replication process of each epoch handles less transactions, and the transaction replicator will process more replication epochs for a given period of time. Since each replication process has a fixed overhead, the overall resource consumption for replication will increase.

When the local timestamp granularity of ordering-sensitive transactions is finer than the ordering interval, the local timestamp alone may not be sufficient to maintain the execution order of the transactions, which have been submitted to multiple datacenters. In this case, several approaches may be implemented. First, regarding ordering-sensitive transactions submitted to the same datacenter, the order may be determined by the local timestamps of the transactions, Second, an ID may be assigned to each datacenter which defines an order among datacenters. For example, for the same epoch, transactions submitted to datacenter 1 are executed before transactions submitted to datacenter 2. Hence, ordering-sensitive transactions may be submitted to different datacenters according to the datacenter ID, and a certain same-epoch execution order may be achieved. Third, application level information may be used to derive orders between two transactions. For example, when it is desired to maintain the order of two transactions, each transaction can be assigned its own ID as well as the ID of its preceding and/or descendant transactions. Finally, if fairness is desired for transactions within the same epoch, transactions in Sj can be ordered in a round-robin fashion. For example, a transaction with the smallest timestamp may be selected from datacenter 1, another transaction with the smallest timestamp may be selected from datacenter 2, etc. As used herein, the term fairness relates to different approaches that can be used to order transactions for execution that have been received at multiple datacenters. That is, fairness is related to giving transactions received at different datacenters the same chance of being executed first. For example, if a high level of fairness is desired, rather than always ordering transactions received during the same epoch based on the ID of datacenters where the transactions were respectively received, which would result in the transactions of the same datacenter always being executed first, a round-robin approach may be utilized to execute transactions received at different datacenters during the same epoch in a different order.

According to exemplary embodiments, the transaction service framework functions utilizing a unique order of transactions in Sj among all datacenters, rather than a specific unique order. As a result, a user may implement any ordering scheme in which all transactions of the same epoch are ordered in the same way on all datacenters.

When clock synchronization is utilized, errors in clock synchronization may result in epochs across different datacenters not matching exactly. According to exemplary embodiments, since all datacenters observe the same sequence of transactions, and since transactions are ordered by their epochIds and do not depend on clock synchronization, data consistency may be achieved and data consistency is not affected by potential clock skew. However, in an exemplary embodiment, clock skew may still be minimized to reduce the delay of transaction replication, since the more replication processes on different datacenters overlap, the less time each datacenter waits for transactions from all datacenters to arrive.

Once the global order is established, the transaction replicator passes Sj to the transaction manager, which then starts the execution process. The transaction manager executes transactions in the transaction set sequentially according to the established global order. When a transaction finishes (e.g., when a transaction commits or aborts), the transaction manager notifies the client library of the results if the transaction is a local transaction, since executing the same transaction on a remote datacenter would yield the same result.

Pipelining the transaction execution process and the transaction replication process for different epochs may result in high system throughput and efficient resource utilization. Further, since a strict order in the execution of distributed transactions is maintained, the execution of transactions in different epochs do not overlap. As a result, the duration of local transaction execution may remain short, and an increase of the queue length may be reduced.

The deterministic parallel execution of replicated transactions according to exemplary embodiments allows each datacenter to independently execute transactions. Thus, when one datacenter is unable to receive transaction replications, or is unable to receive transaction replications in a timely manner, other datacenters may not be affected (e.g., if one datacenter is delayed, overall consistency may still be maintained without delaying all datacenters). For example, future transactions on a delayed datacenter may either successfully execute when they do not depend on results of previous transactions, or may wait for previous transactions to finish.

Figure 6:
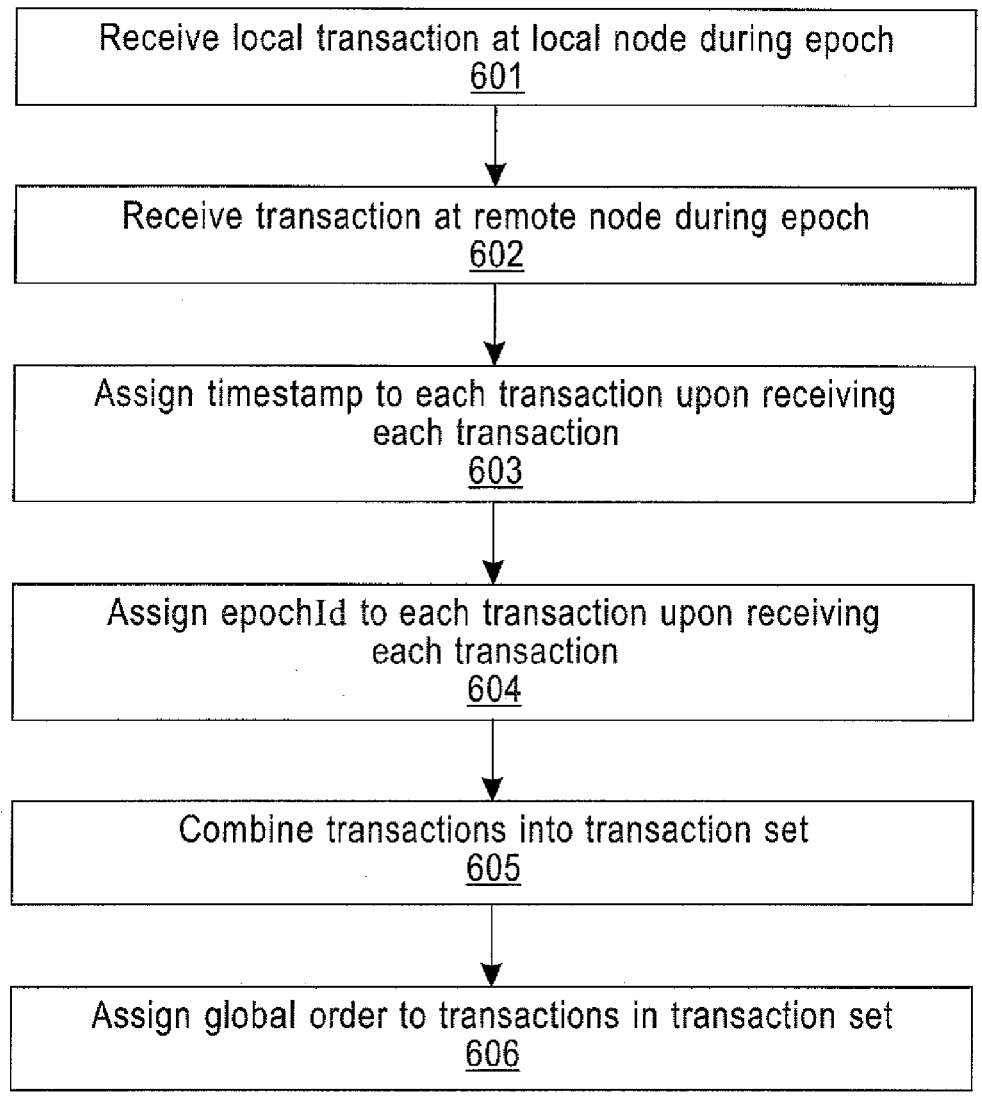
FIG. 6 is a flowchart showing a method of establishing a global consistent execution order of workloads, according to an exemplary embodiment of the present invention.

FIG. 6 is a flowchart showing a method of establishing a global consistent execution order of workloads, according to an exemplary embodiment of the present invention.

At block 601, at least one local transaction is received at a local node during an epoch. At block 602, at least one remote transaction is received at a remote node during the epoch. As described above, epochs correspond to a predefined time period having a fixed length. The local and remote nodes are part of a domain of 2N+1 nodes, wherein N is greater than or equal to 1. At block 603, a timestamp is assigned to each of the at least one local and remote transactions upon respectively receiving the at least one local and remote transactions. The timestamps correspond to a respective arrival time of the at least one local and remote transactions. At block 604, an epochId is assigned to each of the at least one local and remote transactions upon respectively receiving the at least one local and remote transactions. The epochId corresponds to the epoch in which the at least one local and remote transactions were respectively received. At block 605, the at least one local transaction and the at least one remote transaction are combined into a transaction set. At block 606, a global order is assigned to all transactions within the transaction set.

In an ideal, error-free scenario, a set of replicated datastores that start with the same consistent state will end with the same consistent state after executing the same series of read/write operations. However, external factors such as, for example, software bugs, viruses, memory error, communication error, etc. may result in some datastores having different states. According to exemplary embodiments of the present invention, a state signature checking process is utilized to monitor a system for the occurrence of inconsistencies amongst datastores.

In an exemplary embodiment, first, the checkpointing process on all datastores is synchronized periodically by performing checkpointing on all datastores between the same number of epochs. Snapshots may then be generated by checkpointing processes on different datastores based on the corresponding datastore state associated with the same epochId. Once a snapshot is available, the snapshot is scanned and a signature is generated of the snapshot. This signature may then be used to detect potential inconsistency across snapshots. Similar to the transaction replication process according to exemplary embodiments, each datastore may send its local signature to all acceptors in the domain. Once an acceptor has received a signature, the acceptor compares the received signature with its local signature. If the signatures are the same, no action is taken. Otherwise, the acceptor sends a mismatch notification message to the sender indicating that there is a mismatch of signatures, and transmits its local signature to the sender with the mismatch notification message (e.g., the mismatch notification message is linked to the local signature).

When a datastore receives at least N+1 mismatch notifications linked to the same remote signatures, it is determined that the local snapshot of the datastores is inconsistent with a quorum of snapshots on remote datastores. As a result, the datastore is brought offline and restored using one of the snapshots in the quorum. If no quorum of signatures exists, all datastores may be brought offline until a correct signature is identified.

Figure 7:
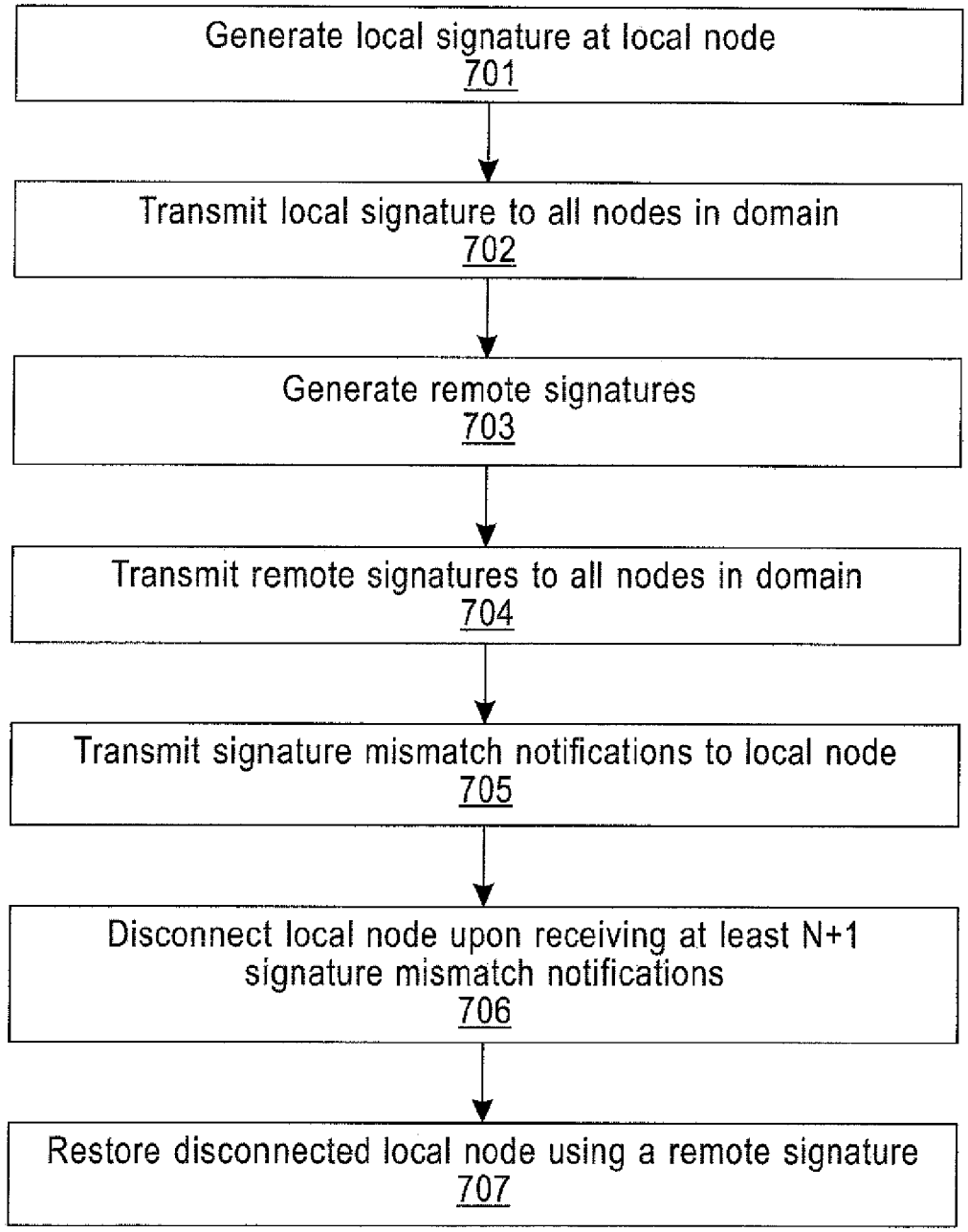
FIG. 7 is a flowchart showing a method of detecting inconsistency among replicated datastore nodes, according to an exemplary embodiment of the present invention.
Figure 8:
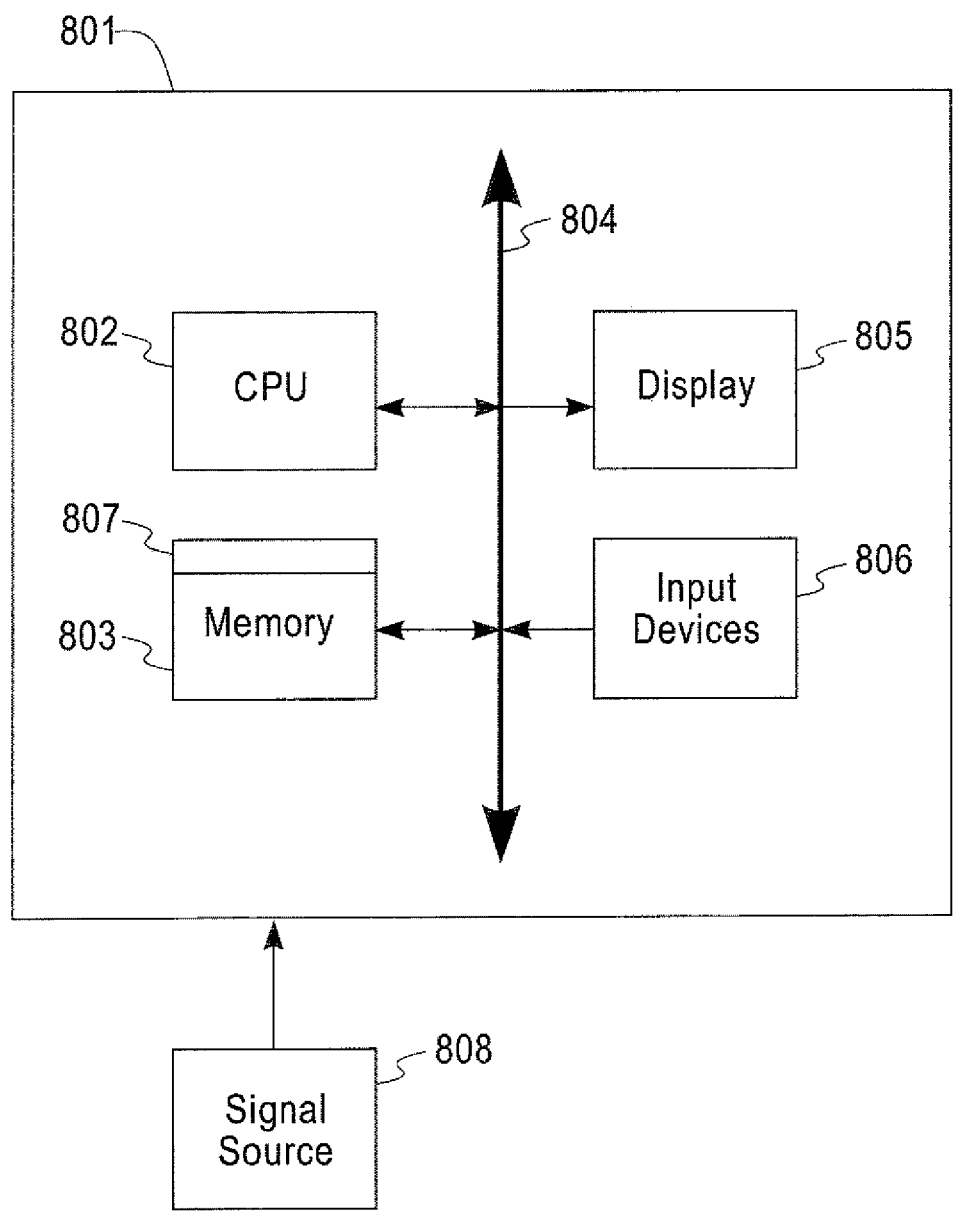
FIG. 8 illustrates a computer system for implementing aspects of exemplary embodiments of the present invention.

FIG. 7 is a flowchart showing a method of detecting inconsistency among replicated datastore nodes, according to an exemplary embodiment of the present invention.

At block 701, a local signature corresponding to a local datastore node is generated by the local datastore node. At block 702, the local signature is transmitted by the local datastore node to all datastore nodes in the domain of datastore nodes. At block 703, remote signatures corresponding to the remote datastore nodes are generated by each of the remote datastore nodes. At block 704, the remote signatures are respectively transmitted by the remote datastore nodes to all datastore nodes in the domain. At block 705, signature mismatch notifications linked to the respective remote signatures are respectively transmitted by the remote data store nodes to the local datastore node upon determining that the remote signature(s) does not match the local signature. At block 706, the local datastore node is disconnected from the domain upon the local datastore node receiving at least N+1 signature mismatch notifications linked to the same remote signature. At block 707, the disconnected local datastore node is restored using one of the remote signatures.

Exemplary embodiments of the state signature checking process may be utilized in an environment in which datastores run the same datastore software, as well as environments in which different datastores run different software.

According to exemplary embodiments of the present invention, a distributed transaction framework establishes a global order on transactions received on a set of distributed datacenters. As a result, all datacenters may execute transactions in the same order. The execution of transactions in the same order across all datacenters allows datacenters to execute transactions locally without distributed commit protocols, and ensures that all datacenters are always in a consistent state. Exemplary embodiments result in transactions being replicated to all nodes in a single round trip of communication, an elimination or reduction of distributed deadlocks, low disruption during failures, and high availability. Exemplary embodiments are independent of the underlying datastore implementation.

According to exemplary embodiments of the present invention, a single round trip transaction replication protocol capable of surviving up to N+1 datacenter failures for a group of 2N+1 participating datacenters is provided. Exemplary embodiments provide for failure isolation, in which the failure of a datacenter at most causes the abort of transactions running in the failed datacenter.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various exemplary embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 7, according to an exemplary embodiment of the present invention, a computer system 801 for implementing aspects of the present invention can comprise, inter alia, a central processing unit (CPU) 802, a memory 803 and an input/output (I/O) interface 804. The computer system 801 is generally coupled through the I/O interface 804 to a display 805 and various input devices 806 such as a mouse and keyboard. The support circuits can include circuits such as cache, power supplies, clock circuits, and a communications bus. The memory 803 can include random access memory (RAM), read only memory (ROM), disk drive, tape drive, etc., or a combination thereof. The present invention can be implemented as a routine 807 that is stored in memory 803 and executed by the CPU 802 to process the signal from the signal source 808. As such, the computer system 801 is a general-purpose computer system that becomes a specific purpose computer system when executing the routine 807 of the present invention.

The computer platform 801 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described exemplary embodiments for a system and method for executing distributed globally-ordered transactional workloads in replicated state machines, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A method of transaction replication, comprising:
transmitting at least one transaction received during an epoch, by a local datastore node, to at least one remote datastore node of a plurality of remote datastore nodes upon an end of the epoch, wherein the epoch corresponds to a predefined time period having a fixed length, and the local datastore node and the plurality of remote datastore nodes are part of a domain of 2N+1 datastore nodes, wherein N is an integer greater than or equal to 1;

logging a receipt of the at least one transaction, by the at least one remote datastore node, upon receiving the at least one transaction at the at least one remote datastore node;

notifying the local datastore node of the receipt of the at least one transaction, by the at least one remote datastore node, upon receiving the at least one transaction at the at least one remote datastore node;

transmitting the at least one transaction to all datastore nodes in the domain other than the local datastore node and the at least one remote datastore node, by the at least one remote datastore node, upon receiving the at least one transaction at the at least one remote datastore node; and adding the at least one transaction to an execution queue at each of the datastore nodes of the domain, wherein each datastore node does not add the at least one transaction to its execution queue until at least N+1 copies of the at least one transaction have been received at that datastore node, wherein the at least one transaction is transmitted from the local datastore node to the at least one remote datastore node, and from the at least one remote datastore node to all datastore nodes other than the local datastore node and the at least one remote datastore node, without being transmitted to a centralized sequencer.

2. The method of claim 1, further comprising:

measuring an elapsed time, by the at least one remote datastore node, since last logging the receipt of the at least one transaction;

transmitting a timeout message to all datastore nodes in the domain, by the at least one remote datastore node, upon the elapsed time exceeding a predefined timeout threshold;

transmitting a timeout confirmation message to all datastore nodes in the domain, by each of the datastore nodes of the domain, upon receiving at least N+1 timeout confirmation messages regarding the local datastore node at each of the datastore nodes; and removing the local datastore node from a participating datastore node list, by each of the datastore nodes of the domain, upon receiving at least N+1 timeout confirmation messages regarding the local datastore node at each of the datastore nodes.

3. The method of claim 2, further comprising:

discarding unfinished processes that have occurred prior to removal from the participating datastore node list, by the local datastore node, upon being removed from the participating datastore node list;

transmitting a recovery notification message, to each of the datastore nodes in the domain, by the local datastore node; and adding the local datastore node to the participating datastore node list, by each of the datastore nodes of the domain, upon each of the datastore nodes receiving at least N+1 copies of the recovery notification message.

4. The method of claim 3, wherein the local datastore node is added to the participating datastore node list by each of the datastore nodes of the domain during different epochs.

5. The method of claim 1, further comprising:

generating a local signature corresponding to the local datastore node, by the local datastore node;

transmitting the local signature, by the local datastore node, to all datastore nodes in the domain;

generating a remote signature corresponding to the at least one remote datastore node, by the at least one remote datastore node;

transmitting the remote signature, by the at least one remote datastore node, to all datastore nodes in the domain;

transmitting a signature mismatch notification linked to the remote signature, by the at least one remote datastore node, to the local datastore node upon determining that the remote signature does not match the local signature; and disconnecting the local datastore node from the domain of datastore nodes upon the local datastore node receiving at least N+1 signature mismatch notifications linked to the remote signature.

6. The method of claim 5, further comprising:

restoring the disconnected local datastore node using the remote signature.

7. A method of establishing a global consistent execution order of transactions, comprising:

dividing a total amount of time into a plurality of epochs, wherein each epoch is a predefined time period having a fixed length;

assigning a plurality of epochIds to the plurality of epochs, wherein the epochIds are a sequentially increasing sequence of numbers that define the epochs;

receiving a first local transaction during a first epoch, and a second local transaction during a second epoch, at a local datastore node;

receiving a first remote transaction during the first epoch, and a second remote transaction during the second epoch, at a remote datastore node, wherein the local and remote datastore nodes are part of a domain of 2N+1 datastore nodes, wherein N is an integer greater than or equal to 1;

assigning a timestamp to each of the transactions upon respectively receiving the transactions, wherein the timestamps indicate a respective arrival time of the transactions;

assigning a first epochId of the plurality of epochIds to the first local transaction and the first remote transaction upon respectively receiving the first local transaction and the first remote transaction at the local and remote datastore nodes;

assigning a second epochId of the plurality of epochIds to the second local transaction and the second remote transaction upon respectively receiving the second local transaction and the second remote transaction at the local and remote datastore nodes;

combining the first local transaction and the first remote transaction into a first transaction set based on the first epochId assigned to the first local transaction and the first remote transaction;

combining the second local transaction and the second remote transaction into a second transaction set based on the second epochId assigned to the second local transaction and the second remote transaction;

assigning a first global order to the first local transaction and the first remote transaction within the first transaction set based on the timestamps assigned to the first local transaction and the first remote transaction without transmitting the first local transaction and the first remote transaction to a centralized sequencer; and assigning a second global order to the second local transaction and the second remote transaction within the second transaction set based on the timestamps assigned to the second local transaction and the second remote transaction without transmitting the second local transaction and the second remote transaction to the centralized sequencer.

8. The method of claim 7, wherein assigning the first and second global orders is further based on respective node IDs of all transactions within the first and second transaction sets, and the respective node IDs correspond to a node at which the transactions were received.

9. The method of claim 7, wherein the first and second local transactions are read-only transactions, and the read-only transactions are not combined into the first and second transaction sets.

10. The method of claim 7, wherein the fixed length of each epoch is about 20 milliseconds.

* * * * *